United States Patent
Pirogovsky et al.

(10) Patent No.: US 8,609,512 B2
(45) Date of Patent: Dec. 17, 2013

(54) METHOD FOR LASER SINGULATION OF CHIP SCALE PACKAGES ON GLASS SUBSTRATES

(75) Inventors: Peter Pirogovsky, Portland, OR (US); Jeffery A. Albelo, Portland, OR (US); James O'Brien, Bend, OR (US); Yasu Osako, Lake Oswego, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 388 days.

(21) Appl. No.: 12/413,068

(22) Filed: Mar. 27, 2009

(65) Prior Publication Data

US 2010/0248451 A1    Sep. 30, 2010

(51) Int. Cl.
*H01L 21/00* (2006.01)

(52) U.S. Cl.
USPC ............... 438/463; 438/33; 438/451; 438/68; 438/113; 438/458; 257/E21.599; 257/E21.001

(58) Field of Classification Search
USPC ............. 438/33, 451, 68, 113–114, 458, 438/460–464; 257/E21.599, E21.001
See application file for complete search history.

(56) References Cited

U.S. PATENT DOCUMENTS

| | | | | |
|---|---|---|---|---|
| 3,562,009 | A * | 2/1971 | Cranston et al. | 427/597 |
| 4,729,971 | A * | 3/1988 | Coleman | 438/462 |
| 4,904,617 | A * | 2/1990 | Muschke | 438/33 |
| 5,543,365 | A * | 8/1996 | Wills et al. | 438/462 |
| 5,584,956 | A * | 12/1996 | Lumpp et al. | 156/272.8 |
| 5,809,987 | A * | 9/1998 | Wark et al. | 125/35 |
| 5,872,046 | A * | 2/1999 | Kaeriyama et al. | 438/465 |
| 5,961,852 | A * | 10/1999 | Rafla-Yuan et al. | 219/121.69 |
| 6,023,039 | A * | 2/2000 | Sawada | 219/121.61 |
| 6,117,347 | A * | 9/2000 | Ishida | 216/52 |
| 6,253,758 | B1 * | 7/2001 | Wark et al. | 125/35 |
| 6,433,301 | B1 | 8/2002 | Dunsky et al. | |
| 6,467,666 | B2 * | 10/2002 | Ichikawa et al. | 225/2 |
| 6,555,447 | B2 * | 4/2003 | Weishauss et al. | 438/460 |
| 6,562,698 | B2 * | 5/2003 | Manor | 438/460 |
| 6,573,156 | B1 | 6/2003 | Wang et al. | |
| 6,744,009 | B1 * | 6/2004 | Xuan et al. | 219/121.67 |
| 6,791,060 | B2 | 9/2004 | Dunsky et al. | |
| 6,805,808 | B2 * | 10/2004 | Fujii et al. | 216/52 |
| 6,838,299 | B2 * | 1/2005 | Mulligan et al. | 438/33 |
| 6,951,627 | B2 * | 10/2005 | Li et al. | 264/400 |
| 6,974,726 | B2 * | 12/2005 | Dani et al. | 438/114 |
| 7,052,975 | B2 * | 5/2006 | Koizumi | 438/460 |

(Continued)

FOREIGN PATENT DOCUMENTS

CN    1768998 A    5/2006
KR    10-2004-0081038 A    9/2004

OTHER PUBLICATIONS

International Preliminary Report on Patenttability of PCT/US2010/028888.
International Search Report of PCT/US2010/028888.

(Continued)

*Primary Examiner* — N Drew Richards
*Assistant Examiner* — Ankush Singal (57) ABSTRACT

An improved method for singulation of compound electronic devices is presented. Compound electronic devices are manufactured by combining two or more substrates into an assembly containing multiple devices. Presented are methods for singulation of compound electronic devices using laser processing. The methods presented provide fewer defects such as cracking or chipping of the substrates while minimizing the width of the kerf and maintaining system throughput.

17 Claims, 11 Drawing Sheets

(56) References Cited

U.S. PATENT DOCUMENTS

| | | | |
|---|---|---|---|
| 7,126,746 B2 | 10/2006 | Sun et al. | |
| 7,183,136 B2* | 2/2007 | Hashimura et al. | 438/113 |
| 7,241,669 B2* | 7/2007 | Swenson et al. | 438/463 |
| 7,262,115 B2 | 8/2007 | Baylis et al. | |
| 7,265,032 B2* | 9/2007 | Sharan et al. | 438/460 |
| 7,265,034 B2* | 9/2007 | Lu et al. | 438/463 |
| 7,279,362 B2* | 10/2007 | Li et al. | 438/114 |
| 7,303,977 B2* | 12/2007 | Voronov et al. | 438/463 |
| 7,332,414 B2 | 2/2008 | Condie et al. | |
| 7,396,742 B2 | 7/2008 | Fukuyo et al. | |
| 7,405,139 B2* | 7/2008 | Daubenspeck et al. | 438/475 |
| 7,456,108 B2* | 11/2008 | Fukazawa | 438/702 |
| 7,494,898 B2* | 2/2009 | Sunohara et al. | 438/455 |
| 7,572,350 B2* | 8/2009 | Furui et al. | 156/272.8 |
| 7,709,768 B2* | 5/2010 | Sercel et al. | 219/121.72 |
| 7,727,853 B2* | 6/2010 | Takeishi et al. | 438/401 |
| 7,910,459 B2* | 3/2011 | Nakamura | 438/463 |
| 8,421,173 B2* | 4/2013 | Wang et al. | 257/432 |
| 2001/0035401 A1* | 11/2001 | Manor | 219/121.72 |
| 2002/0013061 A1* | 1/2002 | Siniaguine et al. | 438/706 |
| 2002/0177288 A1* | 11/2002 | Brown et al. | 438/463 |
| 2003/0006221 A1* | 1/2003 | Hong et al. | 219/121.72 |
| 2003/0044539 A1* | 3/2003 | Oswald | 427/404 |
| 2004/0112880 A1* | 6/2004 | Sekiya | 219/121.69 |
| 2004/0152285 A1* | 8/2004 | Konnemann | 438/460 |
| 2005/0042805 A1* | 2/2005 | Swenson et al. | 438/113 |
| 2005/0059188 A1* | 3/2005 | Bolken et al. | 438/106 |
| 2005/0274702 A1 | 12/2005 | Deshi | |
| 2006/0003553 A1* | 1/2006 | Park et al. | 438/462 |
| 2006/0049156 A1* | 3/2006 | Mulloy et al. | 219/121.71 |
| 2006/0076105 A1* | 4/2006 | Furui et al. | 156/257 |
| 2006/0096962 A1 | 5/2006 | Park | |
| 2006/0169677 A1 | 8/2006 | Deshi | |
| 2006/0220183 A1* | 10/2006 | Asai et al. | 257/622 |
| 2006/0249480 A1* | 11/2006 | Boyle | 216/63 |
| 2006/0261051 A1 | 11/2006 | Unrath et al. | |
| 2006/0270195 A1* | 11/2006 | Yamada et al. | 438/460 |
| 2007/0111477 A1* | 5/2007 | Maruyama et al. | 438/460 |
| 2007/0272668 A1 | 11/2007 | Albelo et al. | |
| 2007/0287266 A1* | 12/2007 | Chung et al. | 438/460 |
| 2007/0298529 A1* | 12/2007 | Maeda et al. | 438/33 |
| 2007/0298587 A1* | 12/2007 | Park et al. | 438/458 |
| 2008/0064186 A1* | 3/2008 | Imori | 438/462 |
| 2008/0105303 A1* | 5/2008 | Oswald et al. | 136/261 |
| 2008/0121906 A1* | 5/2008 | Yakushiji | 257/94 |
| 2008/0217709 A1 | 9/2008 | Minervini et al. | |
| 2008/0299745 A1* | 12/2008 | Morikazu | 438/463 |
| 2010/0015782 A1* | 1/2010 | Yu et al. | 438/463 |

OTHER PUBLICATIONS

Chinese Search Report issued with the Office Action, 2 pages.

* cited by examiner

METHOD FOR LASER SINGULATION OF CHIP SCALE PACKAGES ON GLASS SUBSTRATES

TECHNICAL FIELD

The present invention relates to singulation of electronic devices. In particular it relates to singulation of compound electronic devices, where the devices are constructed by assembling layers of potentially dissimilar substrates. In more particular it relates to singulation of image sensor compound semiconductor devices that comprise a substrate or wafer, often silicon, containing active circuit elements combined with an optically transparent protective substrate, often glass or sapphire.

BACKGROUND

Semiconductor and other electronic devices are typically manufactured by creating multiple copies of a device together on a substrate and then singulating the devices. Substrates can be comprised of silicon, sapphire, ceramic, glass or glass-like material. Singulation is the act of separating multiple devices manufactured on a substrate from each other by creating a cut or break between the devices to form individual devices. Singulation can be performed in many ways. One, called scribing/breaking, is accomplished by first machining a cut or trench in the surface of the substrate or material attached to the surface of the substrate without cutting through the substrate. This is followed by mechanically breaking or cleaving the substrate to separate the die. This cut or trench can be formed by mechanical sawing, chemical etching, laser radiation or a combination. Another way to singulate substrates is called dicing, where the entire depth of the desired separation is performed by mechanical sawing, chemical etching or laser radiation or a combination, without mechanical cleaving.

Figure 1:
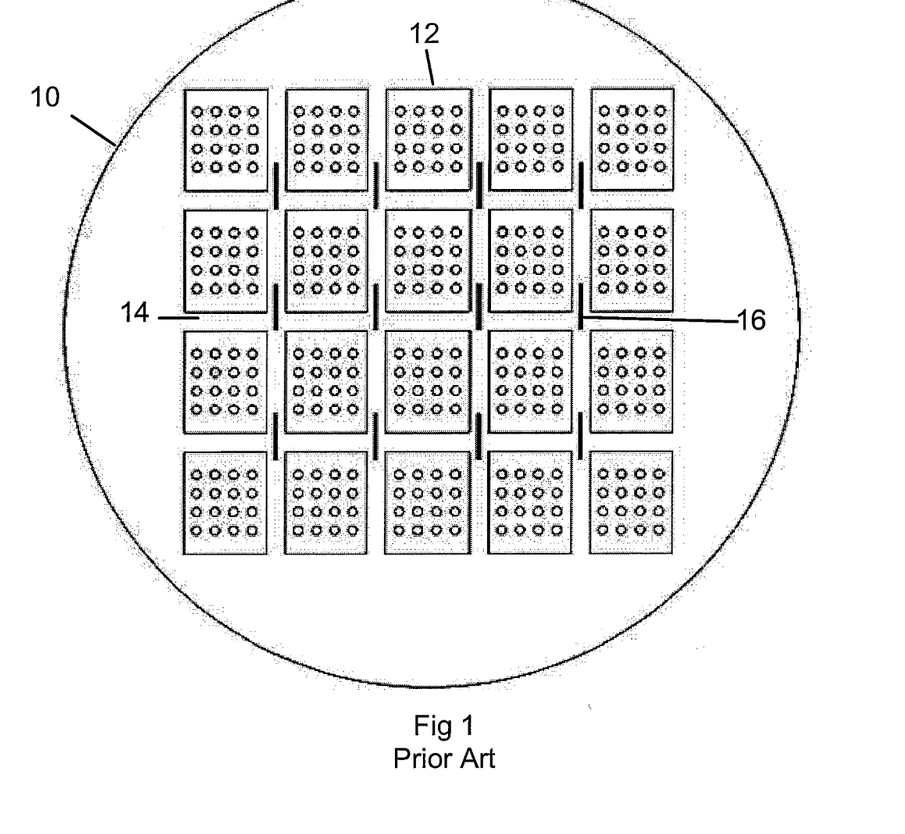
FIG. 1. Top view of a schematic diagram of a semiconductor wafer.

Semiconductor devices are typically arranged in rows and columns on a substrate, with areas free from critical components between them. These free areas are called "streets" and typically form two sets of straight lines arranged perpendicularly to each other in order to yield rectangular devices once singulated. FIG. 1 shows a typical semiconductor wafer 10 comprised of compound devices, one of which is indicated 12 and streets, one of which is indicated 14. Also shown is top surface metal, one of which is indicated 16.

Semiconductor devices are becoming more complex as consumer's desires for more functions in smaller and smaller packages are encouraging manufacturers to put more circuitry into less volume. Three trends emerge from this increase in packaging density. First, substrates are getting thinner, making them more susceptible to damage from cracks or chips. Second, circuit density is getting greater and as substrate space becomes more valuable, there is a desire to minimize the area devoted to streets. Finally, electronic devices are increasingly packaged as compound devices wherein multiple substrates are assembled prior to singulation in order to take advantage of the parallelism inherent in wafer scale integration and package more capability into a smaller volume or to protect underlying components.

Figure 2:
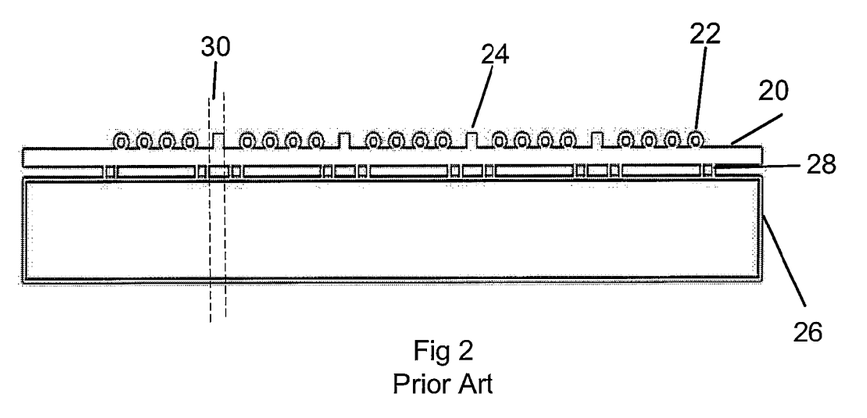
FIG. 2. Side view of compound electronic devices on a substrate.

Compound semiconductor devices can be made of multiple substrates, possibly containing multiple semiconductor devices, assembled into a single functional device. These compound devices are often assembled prior to device singulation and can present problems for typical singulation methods. FIG. 2 shows an exemplary compound device, in this case a complementary metal-oxide semiconductor (CMOS) image sensor, from a side view, showing a silicon wafer 20 containing active circuit elements (not shown), solder bumps, one of which is indicated 22, and top surface metal, one of which is indicated 24. The wafer 20 is separated from the glass cover plate 26 by shims, one of which is indicated 28. One of the streets is indicated 30, as the region between the adjacent dotted lines. In this device, the image sensor is on the surface of the silicon wafer 20 that faces the glass cover plate 26. The transparent cover plate protects the sensor while allowing light to reach the sensor.

One prior art process for singulating semiconductor devices is to cut the wafers with a mechanical saw, for example the DISCO DAD3350 (DISCO Corporation, Tokyo, Japan). One of the disadvantages of mechanical saws is they can cause chipping and cracking along the kerf or cut they create. These chips and cracks weaken the substrate and can cause problems with the eventual semiconductor device. This weakening of substrates due to chipping and cracking becomes worse as substrates become thinner. Mechanical saws also have a minimum kerf size based on the minimum width of the saw. This limits the manufacturer's ability to reduce street size and improve the usable area of the substrate. One possible solution to the cracking problem is to slow down the rate at which the saw moves through the substrate. Careful adjustment of cutting pressure and speed of the saw through the material is required to avoid creating cracks, both of which cause decreases in throughput, since less pressure means more passes with a mechanical saw and slower speed required more time per pass. While this can reduce the cracking and chipping problems, it can slow down the singulation process unacceptably.

An alternative process for singulating semiconductor devices is to use a chemical or plasma etching to form the cuts. An example of this is shown in U.S. Pat. No. 6,573,156, assigned to OMM, (OMM, Inc., San Diego, Calif.). In this process a trench is etched on one side of a wafer, a temporary holding material is applied to that side and the opposite side is then etched. The temporary holding material is them removed to permit the individual semiconductor devices to be separated. This method has the disadvantage of requiring several additional steps and additional equipment to be added to the manufacturing process, thereby increasing manufacturing cost and time.

Figure 3:
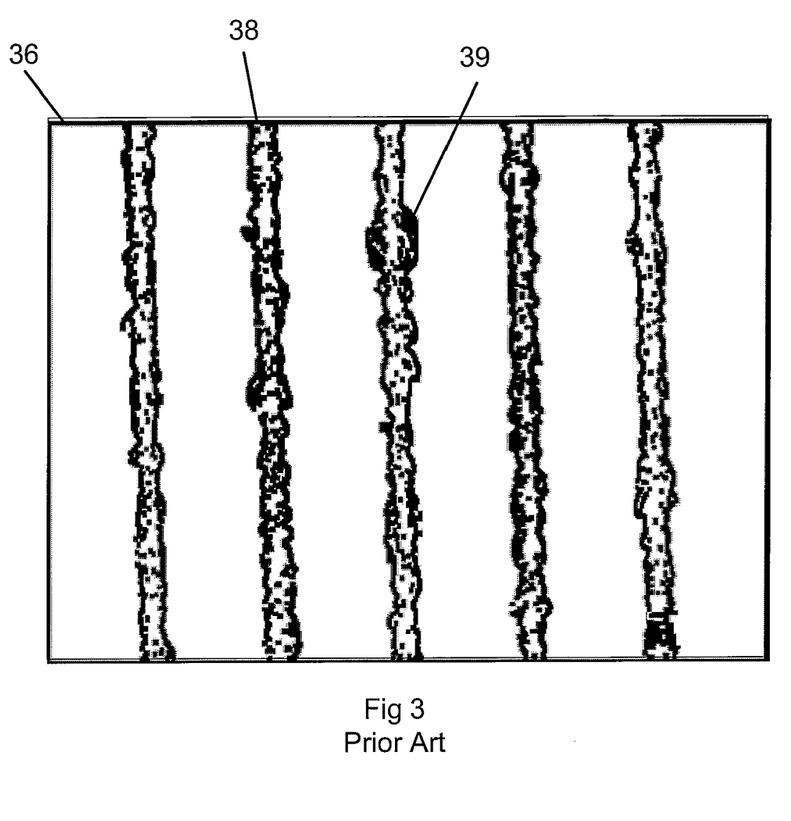
FIG. 3. Photograph of scribes formed by nanosecond pulses.

Another common method of making the cuts is with a laser beam. Laser beams are also capable of making non-straight cuts in cases where device outlines or streets are not straight or perpendicular. Singulation can be accomplished by using a laser beam to machine completely through the substrate forming a through-cut, thereby separating the devices (dicing), or by making a scribe or partial cut into the substrate, which is subsequently mechanically cleaved or fractured from the bottom of the scribe to the opposite surface of the substrate (scribing/breaking). Singulating semiconductor devices with a laser beam can reduce the substrate area devoted to streets, since the laser beam can machine a kerf smaller than the smallest saw blade. The laser beam is capable of either cutting a kerf or creating a scribe in the materials that typically make up compound semiconductor devices such as silicon wafers and glass cover plates. These kerfs or scribes can be smaller than the 100 microns typically made by mechanical saws. FIG. 3 shows a glass substrate after being scribed with nanosecond laser beam pulses. In this case a pulsed, frequency doubled Nd:YAG laser is used to direct laser pulses at a glass substrate to form scribes. The laser operates at 532 nm, emitting pulses with a temporal pulse width of about 30 nanoseconds (ns), energy of about 1 millijoule (mJ) per pulse, a Gaussian spot size of about 15 microns and a pulse repetition rate of about 10 KHz. FIG. 3 shows a photograph of a glass substrate 36 with laser machined scribes, one of which is indicated 38. Note that the scribes show strong chipping 39 along the edges of the scribe. Chipping is undesirable because it can weaken the glass and cause it to fail following packaging. Chipping can occur with both scribing and dicing.

Figure 4:
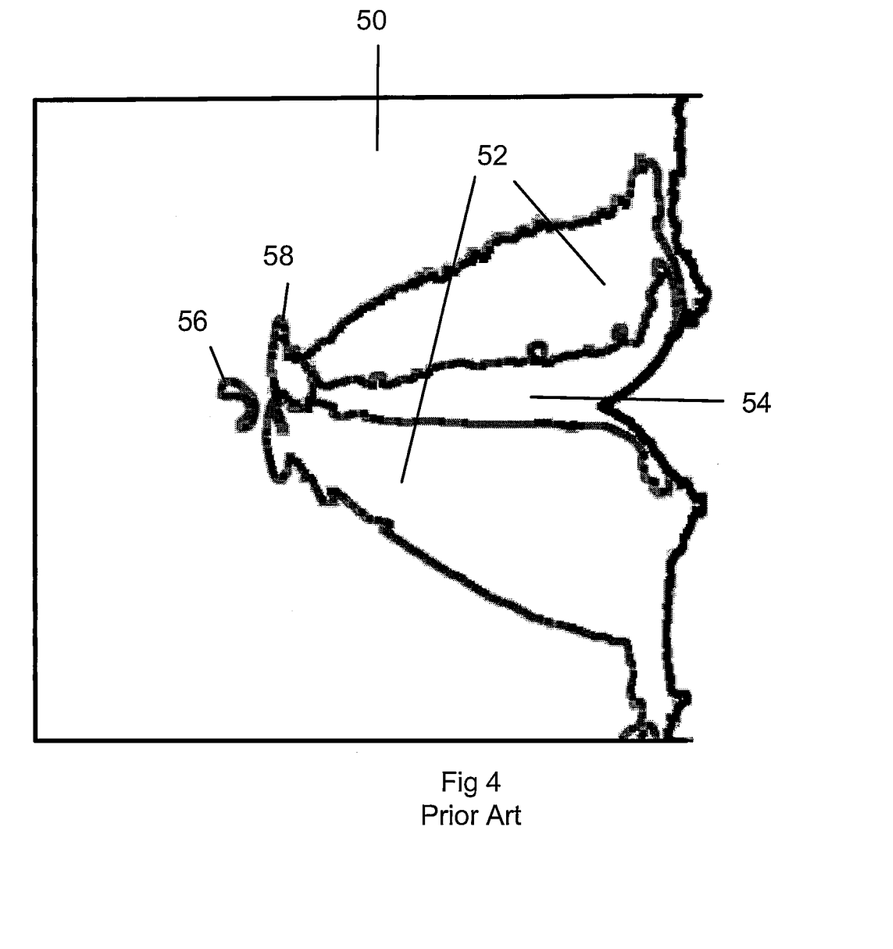
FIG. 4. Cross-sectional photograph of scribes formed in a glass substrate by nanosecond pulses.

Another problem with scribing or cutting glass with nanosecond-scale laser pulses is the creation of cracks. FIG. 4a shows a cross-sectional view of a laser scribe in a glass substrate 50 scribed with the same laser parameters as the scribes in FIGS. 3 and 4. This image clearly shows the heat affected zone (HAZ) 52 surrounding the scribe 54. In addition, a void 56 and stress fractures 58 are shown near the bottom of the scribe 54. These defects, likely caused by thermal effects from the nanoseconds long laser pulses, will cause cracks when the glass substrate is cleaved following scribing as shown in FIG. 4b. FIG. 4b shows a side view of the substrate 50 from FIG. 4a following cleaving, with the scribe 54 on the right and representative cracks 60 shown propagating from the area of the scribe 54. These cracks 60 are a result of cleaving the substrate 50 in the presence of voids and stress fractures as exemplified in FIG. 4a 56, 58. Following packaging, cracks such as these can potentially propagate, causing device failure. Mechanical saws can also create this type of crack.

A process designed to overcome this chipping and cracking is to use a chemical or plasma enchant to "melt" the edges to attempt to remove the effects of the mechanical saw. An example of this is described in US patent application 2006/0249480 Laser Machining Using an Active Assist Gas. In this application, a process of using a halogen assist gas to help reduce chipping and cracking from resulting from laser machining substrates is shown. This application indicates an increase in die strength by reducing chipping and cracking, but at the cost of the additional equipment required to safely deliver and exhaust caustic gas to and from the work area.

Compound devices present additional problems when singulated by existing methods. In the case of mechanical saws, the saw would have to cut through the street 30 between the dotted lines in FIG. 2, through both the silicon wafer 20 and the glass cover plate 26. A particular problem with compound devices is the quality of the kerf. Sawing parameters which work for one material may not be optimal for other materials. Since compound devices, particularly image sensors are made of substrates of dissimilar materials, one set of sawing parameters, such as a particular speed of cut, saw rotation speed or pressure or one set of laser parameters such as pulse energy or repetition rate may be good for one substrate material but not the other. Glass, generally being more brittle than silicon wafers, has a tendency to chip or crack along the kerf when it is sawn or laser processed. In order to prevent chipping and cracking, the speed at which the diamond saw travels while sawing the glass substrate has to be much slower than when sawing silicon alone. This can also be true when laser processing. This has deleterious effects on system throughput. In addition, mechanical saws have a minimum width due to mechanical factors thereby establishing a minimum width for the streets that must contain the kerfs formed when sawn by mechanical saws. Typical minimum width for mechanical saw kerfs are about 100 micron. Since streets represent wasted space on substrates that could otherwise be used for active device elements, there is a desire to minimize the space devoted to streets and increase the space available for active device elements.

In accordance with the information presented above, there is therefore a continuing need for a method of singulating compound semiconductor devices that prevents chipping or cracking damage to the device, avoids adding extra chemicals, equipments and manufacturing steps to the singulation process and maintains system throughput when compared to prior art methods.

SUMMARY OF THE INVENTION

One object of the instant invention is to provide a method for singulation of compound electronic devices. Another object of the instant invention is to provide a method for singulation of compound electronic devices that avoids creating cracks or chips while maintaining acceptable cutting speeds. A further object of the instant invention is to provide a method for singulation of compound electronic devices that minimizes the size of streets. Compound electronic devices are particularly difficult to singulate due to their construction with two or more substrates requiring simultaneous separation to perform singulation. In particular, image sensor devices typically contain both active electronic device substrates such as silicon and transparent protective substrates made of glass or glass-like material, typically with differing thicknesses. One embodiment of the invention disclosed herein uses different separation techniques for different layers in the compound semiconductor device. In particular, at least one substrate is diced or laser machined to form a through-cut kerf while at least one other layer is scribed and subsequently mechanically cleaved.

In an embodiment of the instant invention, laser parameters are predetermined to improve the quality of the substrate following laser processing while maintaining acceptable throughput rates. Laser parameters can be adjusted to determine the rate and depth of cut for different materials and also determine the amount of undesirable cracking and chipping produced as a result of the laser processing. Some of the parameters that can be adjusted include wavelength, beam quality, temporal pulse width, temporal pulse shape, spatial pulse width, spatial pulse shape, pulse repetition frequency, polarization, pulse energy, laser spot size, laser spot position, and laser beam axis direction. Multiple laser beams may also be advantageously used to singulate compound electronic devices. These multiple beams can be derived from a single laser source or from two or more laser sources employing the same or different wavelengths.

Figure 6A:
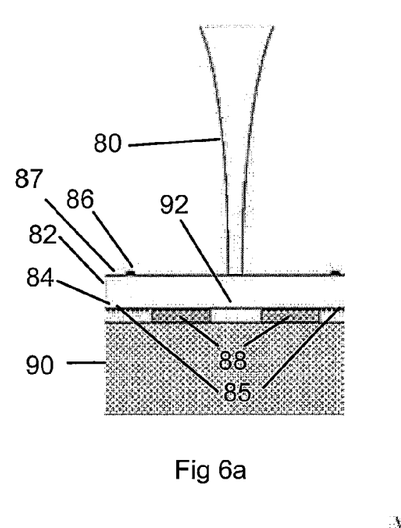
FIGS. 6a, b and c. Schematic diagrams showing steps in the singulation process of compound electronic devices according to an embodiment of the instant invention.
Figure 6B:
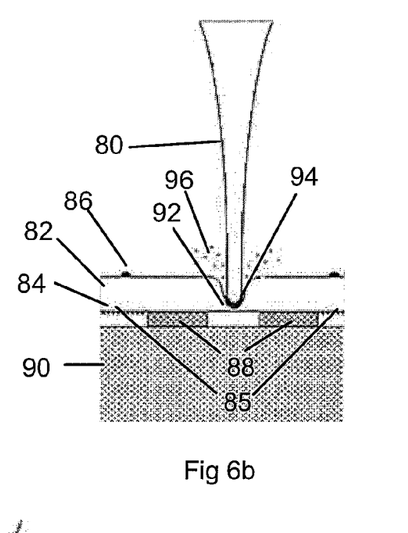
Figure 6C:
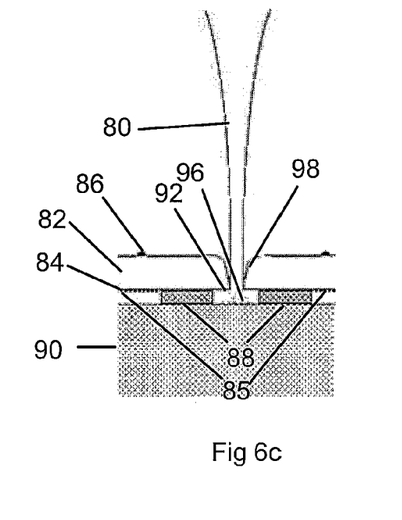

FIGS. 6a, b, and c show schematically how an embodiment of the instant invention begins singulating compound electronic devices, a cross-sectional view of which is illustrated. In FIG. 6a, a pulsed laser beam 80 with laser parameters set to first predetermined values is focused near the surface of first substrate 82. In this example first substrate 82 is a silicon wafer with image sensor electronics 85 on the front surface 84 of the wafer and wafer bumps one of which is indicated 86 to permit subsequent interconnection and packaging. The first substrate 82 is connected to the second substrate 90 by spacers, one of which is indicated 88 that space the second substrate 90 away from the substrate 82 and that form a seal that prevents contaminants from reaching circuitry 85 on the front surface 84 of the first substrate 82. The spacers 88 are arranged along the streets, one of which is indicated 92 of the first substrate 82 to permit singulation while maintaining the aforementioned seal. The space created by spacers 88 can also be filled with some transparent media, in which case the media would be contained intact while maintaining the aforementioned seal. Note that the laser beam 80 is focused directly above the street 92. In FIG. 6b the laser beam 80 has begun to form a kerf 94 in the first substrate 82, while debris 96 is ejected from the kerf 94. In FIG. 6c the laser beam 80 has machined completely through the first substrate 82, forming a through cut 98. Note that the debris 96 created by the machining process is contained to the area between spacers 88 containing the street 92, thereby preventing contamination of circuitry 85 on the front surface 84 of the substrate. The laser beam 80 is moved along the desired direction of the kerf by the laser processing system (not shown), thereby forming a through cut in the first substrate 82 along the area of the street 92.

Figure 7A:
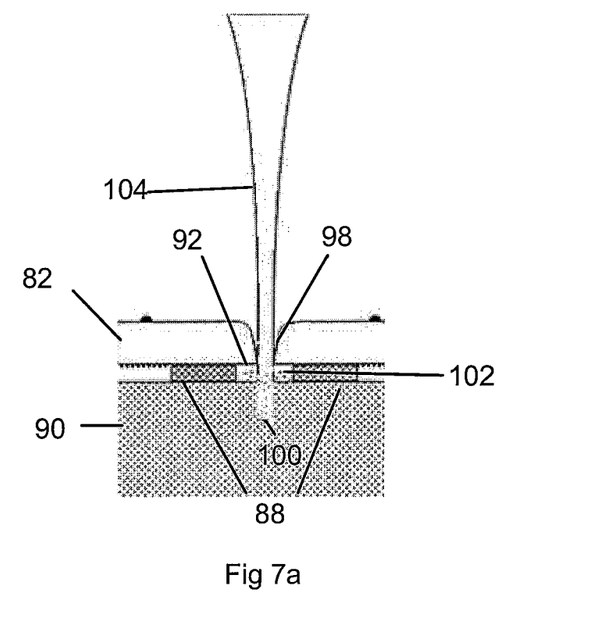
FIGS. 7a and b. Schematic diagrams showing further steps in the singulation process according to an embodiment of the instant invention.
Figure 7B:
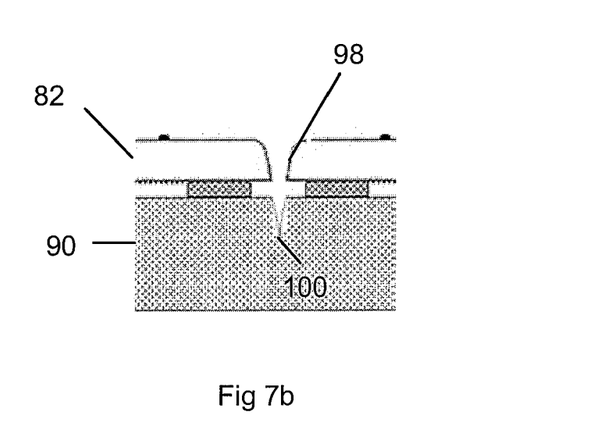

FIGS. 7a and 7b show a schematic view of the second phase of compound electronic device singulation using pulsed laser beams. In FIG. 7a, a pulsed laser beam 104 with laser parameters set to second predetermined values is directed through the machined kerf 98 in the first substrate 82 to impinge the second substrate 90 and form a scribe 100. Note that debris 102 from this machining step is contained by the spacers 88 in the area of the street 92 as above. FIG. 7b shows the completed scribe 100 in second substrate 90. Setting the laser focal spot above the surface of the second substrate 90 and directing it through the machined kerf 98 in the first substrate 82 creates a peak in the spatial energy distribution of the laser beam 104 in the direction perpendicular to the kerf, which tends to form a sharp scribe 100 in the second substrate 90. As the laser beam 104 is moved along the path formed by the machined kerf 98 by the laser processing system (not shown) the scribe 100 in the second substrate 90 is extended along the area of the street 92, thereby scribing the second substrate 90.

Figure 8A:
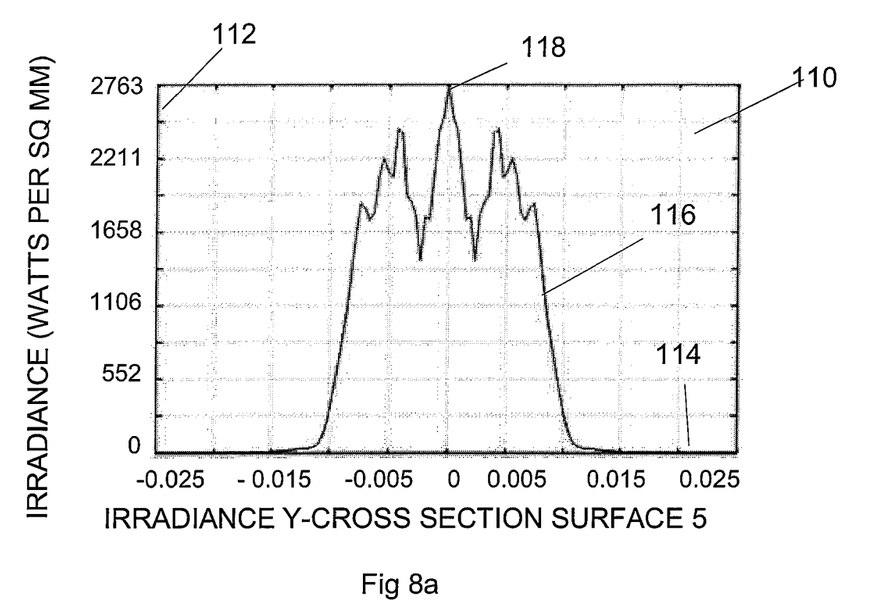
FIGS. 8a and b. Graphs showing spatial irradiance distribution for laser pulses.
Figure 8B:
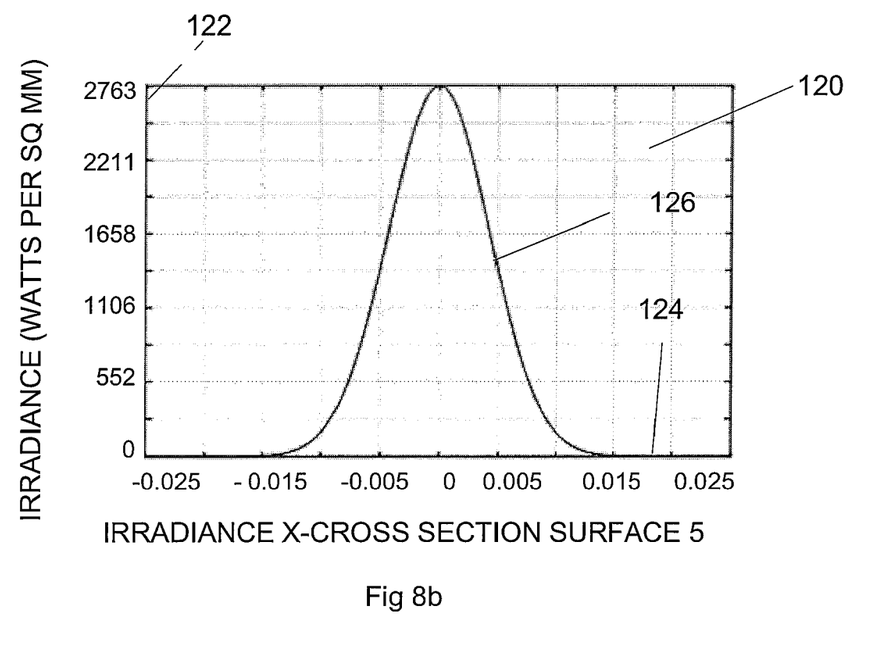

FIGS. 8a and b illustrate the effect of directing a laser beam through the cut made in the first substrate. The laser beam is measured using a setup like FIG. 6c, where the laser beam 80 passes through a cut 98 in a first substrate 82. The laser beam profile is measured as if it were impinging on the second substrate 90. The laser beam 80 has a wavelength of 523 nm; beam $M^2$ of 1.0, a 10 um focal spot focused 400 um above the second substrate 90. In this embodiment the first substrate 82 is between 70 and 180 um thick with a 15 um gap between the first substrate 82 and the second substrate 90. FIG. 8a shows a graph 110 of a simulation of a profile of a laser beam 116 as it would appear on the surface of the second substrate 90 when directed through the first substrate 82 as described, which plots irradiance in Watts/mm² 112 vs. distance from the optical axis in mm 114 measured in a direction perpendicular to the cut 98 in the first substrate 83. The profile in FIG. 8a shows a sharp peak 118 in the distribution. This sharp peak 118 is formed as a result of diffraction and reflections in the laser beam as it passes through the cut 98 in the first substrate 82. FIG. 8b shows a graph 120 of a simulation of the same laser beam 90 except measured parallel to the direction of the cut 98. This graph plots irradiance in Watts/mm2 122 vs. displacement from the optical axis of the laser beam in mm 124. Note that this distribution 126 of the laser beam irradiance follows a Gaussian distribution in contrast to the spiked distribution shown at 116. The sharp peaks on the pulse spatial distribution in the direction perpendicular to the direction of the cut cause the scribe formed in the glass to be narrower and more likely to cleave without cracks or chipping due to the increased melting close to the edge of the scribe. In addition, the defocused beam passing through the first substrate can remove burrs and brittle materials such as low-k dielectrics on the edges of the kerf thereby making the kerf stronger and more resistant to cracking.

Figure 10:
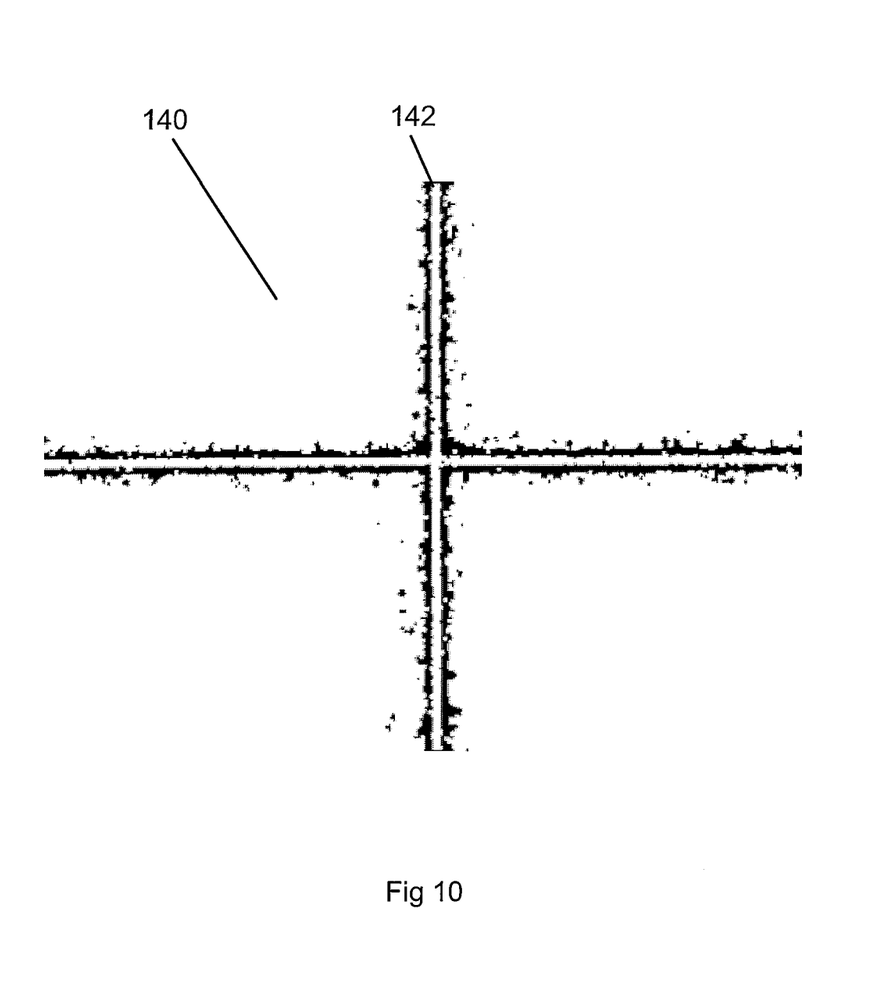
FIG. 10. Photograph of scribes formed in a glass substrate by pulses according to an embodiment of the instant invention.
Figure 11:
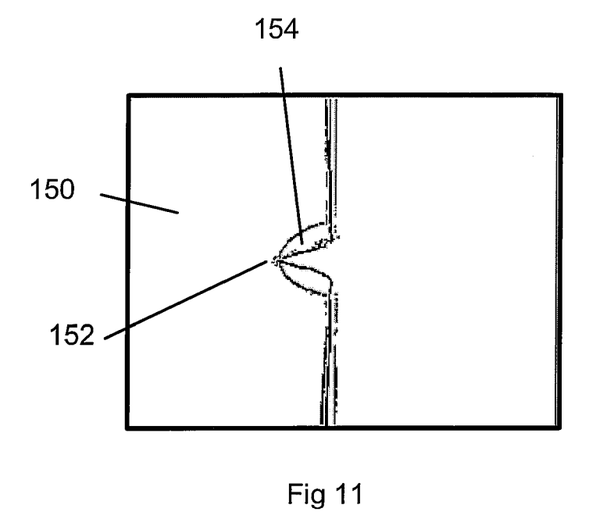
FIG. 11. Cross-sectional photograph of a glass substrate scribe following scribing according to an embodiment of the instant invention.
Figure 12:
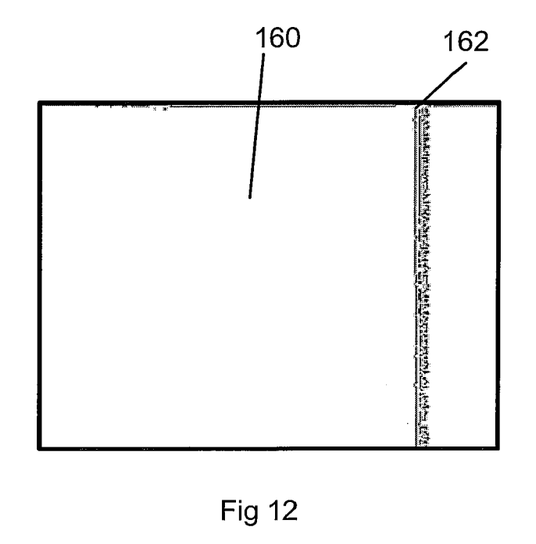
FIG. 12. Side view photograph of a glass substrate following scribing and cleaving according to an embodiment of the instant invention

An embodiment of the instant invention uses picosecond (ps) or shorter laser pulses at high repetition rates to improve the quality of compound device singulation while maintaining system throughput by reducing stress fractures and cracks caused by laser processing. FIG. 10 shows a glass substrate 140 following scribing with picosecond pulses. Note that the scribes 142 show little evidence of chipping and cracking as shown in FIG. 3 (prior art). FIG. 11 shows a cross sectional view of a glass substrate 150 showing a scribe 152 prior to cleaving. Note the relatively featureless heat affected zone 154, showing none of the void 56 or fractures 58 visible in FIG. 4 (prior art). FIG. 12 shows a side view of a substrate 160 following scribing with picosecond pulses and cleaving with the scribe 162 shown on the right hand side of the substrate 160. Note the absence of cracking in the glass substrate 160, contrasted with the cracks 60 evident in a similar view shown in FIG. 5 (prior art). This absence of chipping or cracking in this cross section demonstrates that picosecond and shorter pulses can scribe glass and provide a crack-free cleave plane.

An embodiment of the instant invention uses picosecond or femtosecond duration laser pulses at selected energy levels to reduce the amount of chipping and cracking of the substrates when machining. FIG. 10 shows a substrate 149 following scribing with a picosecond laser pulses. Note the smooth edges of the scribe 142, showing little of the chipping or cracking associated with prior art nanosecond pulse scribing. These short duration pulses ablate or remove material from the workpiece without causing chipping or cracking because the duration of the pulse is shorter than the amount of time required for heat generated by the process to migrate from the location of the laser spot to the surrounding material and thereby create a heat affected zone (HAZ). In addition, the amount of energy per pulse is carefully set to be within a range of one to ten times the minimum amount of energy required to begin ablating the material, also called the ablation threshold. Energies of less than one times the ablation threshold for a given material will of course not ablate the material. Energies in excess of ten times the ablation threshold will ablate the material and in addition couple energy into the surrounding material creating a HAZ containing cracks and chips, reducing the ablation efficiency. Laser pulses of femtosecond or picosecond duration with per-pulse energies of between one and ten times the ablation threshold of a particular material will remove material within the focal spot of the laser beam with minimal heating effect on the surrounding material.

Figure 9A:
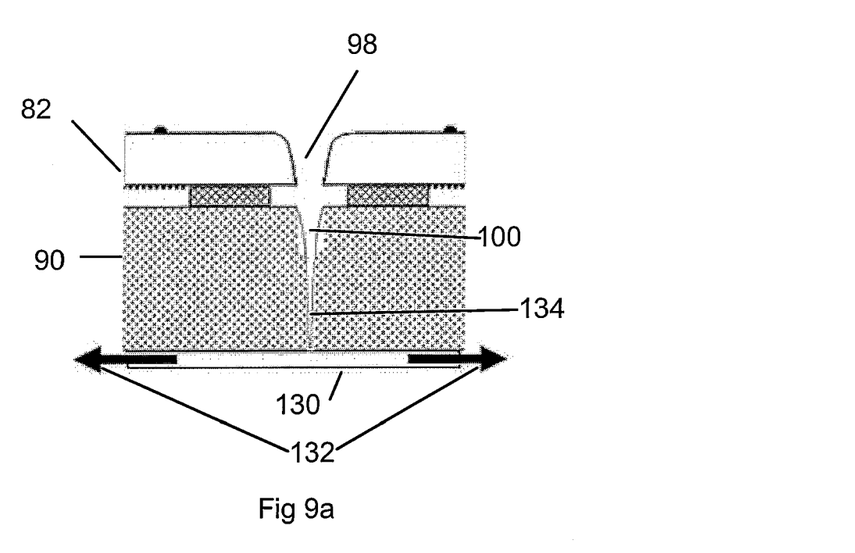
FIGS. 9a and b. Schematic diagrams showing substrate cleaving according to embodiments of the instant invention.
Figure 9B:
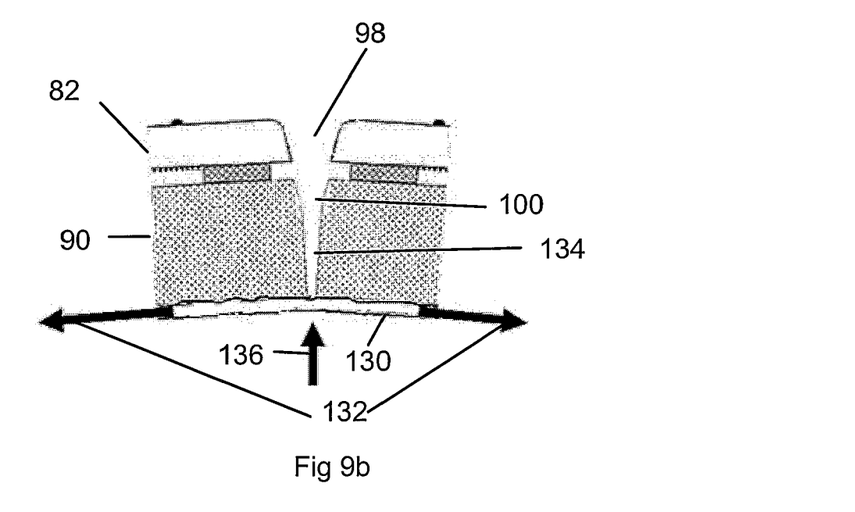

Following laser machining of the first and second substrates, FIGS. 9a and b illustrate schematically two ways to cleave the substrates following through cutting and scribing. FIG. 9a shows the compound electronic device from FIGS. 6 and 7 following through cutting of the first substrate 82 forming a kerf 98 and following scribing the second substrate 90 forming a scribe 100. The substrates comprising the devices is attached to dicing tape 130, which is an adhesive tape typically mounted on a metal ring with an opening larger than the substrates. The dicing tape 130 is then stretched in a direction 132 perpendicular to the scribe 100 thereby causing the second substrate to cleave 134 starting with the scribe 100. Another embodiment of the instant invention show in FIG. 9b uses a device (not shown) to apply upward pressure 135 on the bottom of the second substrate 90 directly underneath the scribe 100 as the tape is also stretched 132 perpendicular to the second substrate 90 to assist in the formation of the cleave 134. FIG. 10 shows a side view of a substrate 140 scribed 142 and cleaved according to the instant invention. Note the lack of cracking and chipping, in contrast to the prior art side view shown in FIG. 4b.

DETAILED DESCRIPTION OF REFERRED EMBODIMENTS

One object of the instant invention is to provide a method for singulation of compound electronic devices. Another object of the instant invention is to provide a method for singulation of compound electronic devices that avoids creating cracks or chips while maintaining acceptable cutting speeds. A further object of the instant invention is to provide a method for singulation of compound electronic devices that minimizes the size of streets. Compound electronic devices are particularly difficult to singulate due to their construction with two or more substrates requiring simultaneous separation to perform singulation. In particular, image sensor devices typically contain both active electronic device substrates such as silicon and transparent protective substrates made of glass or glass-like material, typically with differing thicknesses. One embodiment of the invention disclosed herein uses different separation techniques for different layers in the compound semiconductor device. In particular, at least one substrate is diced or laser machined to form a through-cut kerf while at least one other layer is scribed and subsequently mechanically cleaved. An exemplary system that can be employed to perform the methods disclosed by the instant invention is the Cignis Wafer Singulation System, manufactured by Electro Scientific Industries, Inc. Portland, Oreg. This system typically employs an ultra fast laser manufactured by Lumera Laser, Kaiserslautern, Germany which has an average power of 20 Watts and operates at a wavelength of 532 nm. Other lasers could also be used to perform this singulation as long as they could be adjusted to operate within the parameter ranges specified by the instant invention.

In an embodiment of the instant invention, laser parameters are predetermined to improve the quality of the substrate following laser processing while maintaining acceptable throughput rates. Laser parameters can be adjusted to determine the rate and depth of cut for different materials and also determine the amount of undesirable cracking and chipping produced as a result of the laser processing. Some of the parameters that can be adjusted include wavelength, beam quality, temporal pulse width, temporal pulse shape, spatial pulse width, spatial pulse shape, pulse repetition frequency, polarization, pulse energy, laser spot size, laser spot position, and laser beam axis direction. Multiple laser beams may also be advantageously used to singulate compound electronic devices. These multiple beams can be derived from a single laser source or from two or more laser sources employing the same or different wavelengths. A method for advantageously combining laser beams for a laser processing application is shown in U.S. patent application number 2006/0261051 Synthetic Pulse Repetition Rate Processing for Dual-Headed Laser Processing Systems, (Unrath, et. al.) assigned to the assignee of the instant invention.

Some complex electronic devices, more particularly semiconductor image sensors, comprise a semiconductor substrate that has an active sensor device area with a transparent protective cover in close proximity with but not touching the substrate, except at the edges outside of the active circuit area. This device can be schematically represented as shown in FIGS. 6 and 7. FIGS. 6a, b, and c show schematically how an embodiment of the instant invention begins singulating compound electronic devices, a cross-sectional view of which is illustrated. In FIG. 6a, a pulsed laser beam 80 with laser parameters set to first predetermined values is focused near the surface of first substrate 82. In this example first substrate 82 is a silicon wafer with image sensor electronics 85 on the front surface 84 of the wafer and wafer bumps one of which is indicated 86 to permit subsequent interconnection and packaging. The first substrate 82 is connected to the second substrate 90 by spacers, one of which is indicated 88 that space the second substrate 90 away from the substrate 82 and that form a seal that prevents contaminants from reaching circuitry 85 on the front surface 84 of the first substrate 82. The spacers 88 are arranged along the streets, one of which is indicated 92 of the first substrate 82 to permit singulation while maintaining the aforementioned seal. Note that the laser beam 80 is focused directly above the street 92. In this embodiment the laser beam is directed perpendicular to the surface of the substrate, although other angles may be used advantageously to produce differently shaped kerfs if desired.

Laser parameters for this step include a pulse width between about 100 fs and 1 ns, particularly between about 1 ps and 1 ns, and more particularly about 100 ps. The laser wavelength is between about 255 um and 10 um, particularly between about 255 um and 1.0 um, and more particularly about 532 nm. The laser beam is focused to form a focal spot at or near the front surface 84 of the first substrate 82 of between about 1 um and 100 um, particularly between about 1 um and 20 um, more particularly about 10 um. Pulse repetition frequency for this step is between about 100 kHz and 10 MHz.

Spatial pulse shape for this step is approximately Gaussian, although other shapes may be used advantageously. For example, a square spatial distribution, formed by a combination of optical components such as apertures and filters, could be used to change the shape of the kerf walls without slowing the process or creating chips or cracks. This is also true of polarization. Circular polarization will cause machining to occur evenly in all directions from the central axis of the laser beam, while linearly polarized laser beams preferentially ablate material along the direction parallel with the polarization. Radial polarization can result in smaller spot sizes for a given wavelength. Temporal pulse shape is approximately Gaussian, although other shapes may be used. Pulses as emitted from laser resonators typically have Gaussian temporal profiles but these profiles can be modified by available optical means to have pulses which range from square to more complex tailored shapes. Production of tailored pulses in particular is disclosed in U.S. Pat. No. 7,126,746 Generating Sets of Tailored Pulses (Sun, et. al.), assigned to the assignee of the instant invention, included herein by reference. The laser spot shape can also be altered to produce other shapes. For example, the spatial distribution can be made elliptical or rectangular using standard optical components such as apertures and lenses. In addition, holographic optical elements may be used to form the beam into a variety of useful shapes, including a "top hat" configuration, a "ring" configuration or other shapes. Descriptions of holographic or diffractive optical elements used in laser micromachining applications are found in U.S. Pat. No. 6,433,301 Beam Shaping and Projection Imaging with Solid State UV Gaussian Beam to Form Vias (Dunsky, et. al.) and U.S. Pat. No. 6,791,060 Beam Shaping and Projection Imaging with Solid State UV Gaussian Beam to Form Vias (Dunsky, et. al.), both assigned to the assignee of the instant invention and included herein by reference.

In an embodiment of the instant invention the kerfs or scribes formed in the substrates are typically straight lines, although curves and other shapes may be used advantageously in some instances. Furthermore the laser beam can be directed to move with respect to the workpiece in such a fashion as to deliver pulses at a rate that can dice or through-cut a substrate in one pass, i.e. the laser beam moves along a path on substrate from one point to another without reversing direction or otherwise machining the same point more than once, relying on the laser pulses to completely machine through the substrate before moving on to the next position. More typically the laser beam is directed to machine the workpiece in more than one pass, where the laser beam is directed to each point along the kerf or scribe more than once, each pass removing more material in depth until the desired depth or though-cut is achieved.

In FIG. 6b the laser beam 80 has begun to form a kerf 94 in the first substrate 82, while debris 96 is ejected from the kerf 94. In FIG. 6c the laser beam 80 has machined completely through the first substrate 82, forming a through cut 98. Note that the debris 96 created by the machining process is contained to the area between spacers 88 containing the street 92, thereby preventing contamination of circuitry 85 on the front surface 84 of the substrate. The laser beam 80 is moved along the desired direction of the kerf by the laser processing system (not shown), thereby forming a through cut in the first substrate 82 along the area of the street 92.

FIGS. 7a and 7b show a schematic view of the second phase of compound electronic device singulation using pulsed laser beams. In FIG. 7a, a pulsed laser beam 104 with laser parameters set to second predetermined values is directed through the machined kerf 98 in the first substrate 82 to impinge the second substrate 90 and form a scribe 100. Note that debris 102 from this machining step is contained by the spacers 88 in the area of the street 92 as above. FIG. 7b shows the completed scribe 100 in second substrate 90. Setting the laser focal spot above the surface of the second substrate 90 and directing it through the machined kerf 98 in the first substrate 82 creates a peak in the spatial energy distribution of the laser beam 104 in the direction perpendicular to the kerf, which tends to form a sharp scribe 100 in the second substrate 90. As the laser beam 104 is moved along the path formed by the machined kerf 98 by the laser processing system (not shown) the scribe 100 in the second substrate 90 is extended along the area of the street 92, thereby scribing the second substrate 90.

Laser parameters for the second phase of this embodiment can be the same as the first phase except that the laser spot is focused above the surface to be scribed. The laser spot is focused to a point between about 100 um above the surface to about 1000 um above the surface. More particularly the spot is focused to a point about 400 um above the surface to be scribed. This has the effect of defocusing the laser beam at the surface of the workpiece, thereby reducing the laser irradiance at any given point on the surface and thereby reducing the tendency of the material to crack due to excessive energy. In addition the defocused beam tends to remove burrs on the surface thereby decreasing the likelihood of loose material or sharp edges, both of which are undesirable. In addition, focusing the laser beam through the kerf previously machined in the first substrate 82 causes the beam to shape and refocus advantageously.

In another embodiment of the instant invention, the first substrate is not fully through cut in the first phase. Instead, the first substrate 82 is cut nearly through, leaving a few microns of material at the bottom of the kerf to maintain some structural stability during the next phase of the process. This is equivalent to stopping the process at FIG. 6b. The second phase would then focus the laser 104 in FIG. 7a through the nearly through cut since it is transparent to the wavelength of laser radiation used.

FIGS. 8a and b illustrate the effect of directing a laser beam through the cut made in the first substrate. The laser beam is measured using a setup like FIG. 6c, where the laser beam 80 passes through a cut 98 in a first substrate 82. The laser beam profile is measured as if it were impinging on the second substrate 90. The laser beam 80 has a wavelength of 523 nm; beam $M^2$ of 1.0, a 10 um focal spot focused 400 um above the second substrate 90. In this embodiment the first substrate 82 is between 70 and 180 um thick with a 15 um gap between the first substrate 82 and the second substrate 90. FIG. 8a shows a graph 110 of a simulation of a profile of a laser beam 116 as it would appear on the surface of the second substrate 90 when directed through the first substrate 82 as described, which plots irradiance in Watts/$MM^2$ 112 vs. distance from the optical axis in mm 114 measured in a direction perpendicular to the cut 98 in the first substrate 83. The profile in FIG. 8a shows a sharp peak 118 in the distribution. This sharp peak 118 is formed as a result of diffraction and reflections in the laser beam as it passes through the cut 98 in the first substrate 82. FIG. 8b shows a graph 120 of a simulation of the same laser beam 90 except measured parallel to the direction of the cut 98. This graph plots irradiance in Watts/mm2 122 vs. displacement from the optical axis of the laser beam in mm 124. Note that this distribution 126 of the laser beam irradiance follows a Gaussian distribution in contrast to the spiked distribution shown at 116. The sharp peaks on the pulse spatial distribution in the direction perpendicular to the direction of the cut cause the scribe formed in the glass to be narrower and more likely to cleave without cracks or chipping due to the increased melting close to the edge of the scribe. In addition, the defocused beam passing through the first substrate can remove burrs and brittle materials such as low-k dielectrics on the edges of the kerf thereby making the kerf stronger and more resistant to cracking.

An embodiment of the instant invention uses picosecond or shorter laser pulses at high repetition rates to improve the quality of compound device singulation while maintaining system throughput by reducing stress fractures and cracks caused by laser processing. FIG. 10 shows a glass substrate 140 following scribing with picosecond pulses. Note that the scribes 142 show little evidence of chipping and cracking as shown in FIG. 3 (prior art). FIG. 11 shows a cross sectional view of a glass substrate 150 showing a scribe 152 prior to cleaving. Note the relatively featureless heat affected zone 154, showing none of the void 56 or fractures 58 visible in FIG. 4 (prior art). FIG. 12 shows a side view of a substrate 160 following scribing with picosecond pulses and cleaving with the scribe 162 shown on the right hand side of the substrate 160. Note the absence of cracking in the glass substrate 160, contrasted with the cracks 60 evident in a similar view shown in FIG. 5 (prior art). This absence of chipping or cracking in this cross section demonstrates that picosecond and shorter pulses can scribe glass and provide a crack-free cleave plane.

Figure 5:
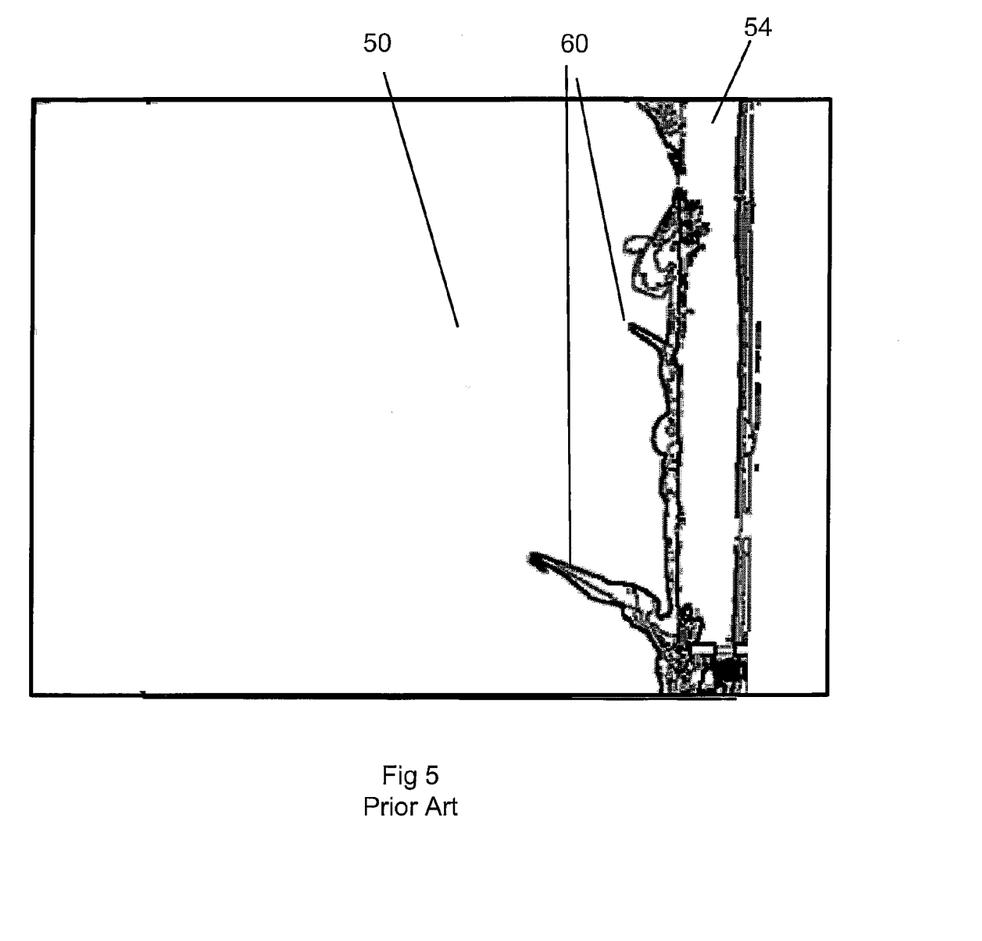
FIG. 5. Side view photograph of a glass substrate following scribing by nanosecond pulses and cleaving.

In particular, an embodiment of the instant invention employs laser pulses with temporal pulse widths in the picosecond or femtosecond range to minimize chipping and cracking in the substrates being processed. FIG. 5 shows a substrate 70 following scribing with a picosecond laser pulses. Note the smooth edges of the scribe 72, showing none of the chipping or cracking associated with prior art nanosecond pulse scribing. These short duration pulses ablate or remove material from the workpiece without causing chipping or cracking because the duration of the pulse is shorter than the amount of time required for heat generated by the process to migrate from the location of the laser spot to the surrounding material and thereby create a heat affected zone (HAZ). In addition, the amount of energy per pulse is carefully set to be within a range of one to ten times the minimum amount of energy required to begin ablating the material, also called the ablation threshold. Energies of less than one times the ablation threshold for a given material will of course not ablate the material. Energies in excess of ten times the ablation threshold will ablate the material and in addition couple energy into the surrounding material creating a HAZ containing cracks and chips. Laser pulses of femtosecond or picosecond duration with per-pulse energies of between one and ten times the ablation threshold of a particular material will remove material within the focal spot of the laser beam with minimal heating effect on the surrounding material.

Following laser machining of the first and second substrates, FIGS. 9a and b illustrate schematically two ways to cleave the substrates following through cutting and scribing. FIG. 9a shows the compound electronic device from FIGS. 6 and 7 following through cutting of the first substrate 82 forming a kerf 98 and following scribing the second substrate 90 forming a scribe 100. The substrates comprising the devices is attached to dicing tape 130, which is an adhesive tape typically mounted on a metal ring with an opening larger than the substrates. The dicing tape 130 is then stretched in a direction 132 perpendicular to the scribe 100 thereby causing the second substrate to cleave 134 starting with the scribe 100. Another embodiment of the instant invention show in FIG. 9b uses a device (not shown) to apply upward pressure 135 on the bottom of the second substrate 90 directly underneath the scribe 100 as the tape is also stretched 132 perpendicular to the second substrate 90 to assist in the formation of the cleave 134. FIG. 10 shows a side view of a substrate 140 scribed 142 and cleaved according to the instant invention. Note the lack of cracking and chipping, in contrast to the prior art side view shown in FIG. 4b.

First laser parameters include a wavelength between about 266 nm and 1064 nm, a total power between about 4 W and 12 W, a spot size between about 10 microns and 50 microns, a pulse repetition rate between about 100 KHz and 1 MHz, and a pulse width between about 1 femtosecond and 1 nanosecond and second laser parameters include a wavelength between about 266 nm and 1064 nm, a total power between about 4 W and 12 W, a spot size between about 10 microns and 50 microns, apulse repetition rate between about 100 KHz and 1 MHz, and a pulse width between about 1 femtosecond and 1 nanosecond.

It will be apparent to those of ordinary skill in the art that many changes may be made to the details of the above-described embodiments of this invention without departing from the underlying principles thereof. The scope of the present invention should, therefore, be determined only by the following claims.

We claim:
1. An improved method for singulation of compound electronic devices using a laser processing system, wherein a plurality of said compound electronic devices are manufactured in an assembly that includes a first substrate and a second substrate arranged in layers, said plurality of said compound electronic devices being arranged so as to provide streets between said compound electronic devices, and said laser processing system having a laser beam having parameters, said laser beam operative to laser machine said assemblies, the improvements comprising:
predetermining first laser parameters associated with performing a through cut on said first substrate;
predetermining second laser parameters associated with performing a scribe on said second substrate;
laser machining said through cut in said first substrate with said laser beam using first predetermined laser parameters, said through cut coincident with one of said streets between said compound semiconductor devices;
laser machining said scribe in said second substrate with said laser beam using second predetermined laser parameters, said scribe in said second substrate being aligned with said through cut in said first substrate; and
singulating said compound electronic devices by mechanically cleaving said second substrate along said scribe.

2. The method of claim 1 wherein a focal point of said laser beam is located at about said top surface of said first substrate to perform said laser machining of said through cut in said first substrate.

3. The method of claim 1 wherein a focal point of said laser beam is located between about 100 microns and 1000 microns above said top surface of said first substrate to perform said laser machining of said scribe in said second substrate.

4. The method of claim 1 wherein said through cut in said first substrate is laser machined by making between 2 and 10 passes of said laser beam on said first substrate.

5. The method of claim 1 wherein a travel speed of said laser beam is between about 100 and 500 mm/s while performing said laser machining of said first substrate.

6. The method of claim 1 wherein a travel speed of said laser beam is between about 200 and 600 mm/s while performing said laser machining of said second substrate.

7. The method of claim 1, wherein said first laser parameters include a wavelength between about 266 nm and 1064 nm, a total power between about 4 W and 12 W, a spot size between about 10 microns and 50 microns, a pulse repetition rate between about 100 KHz and 1 MHz, and a pulse width between about 1 femtosecond and 1 nanosecond.

8. The method of claim 1, wherein said second laser parameters include a wavelength between about 266 nm and 1064 nm, a total power between about 4 W and 12 W, a spot size between about 10 microns and 50 microns, a pulse repetition rate between about 100 KHz and 1 MHz, and a pulse width between about 1 fennosecond and 1 nanosecond.

9. The method of claim 1, wherein laser machining said scribe in said second substrate comprises removing a portion of the second substrate.

10. The method of claim 1, wherein the second substrate comprises glass.

11. An improved method for singulation of compound electronic devices using a laser processing system, wherein a plurality of said compound electronic devices are manufactured in an assembly that includes a first substrate and a second substrate arranged in layers, said plurality of said compound electronic devices being arranged so as to provide streets between said compound electronic devices, and said laser processing system having a laser beam having parameters, said laser beam operative to laser machine said assemblies, the improvements comprising:
  predetermining first laser parameters associated with performing a near through cut extending partially through said first substrate;
  predetermining second laser parameters associated with performing a scribe on said second substrate;
  laser machining said near through cut in said first substrate with said laser beam having first predetermined laser parameters, said near through cut coincident with one of said streets between said compound semiconductor devices; and
  laser machining said scribe in said second substrate with said laser beam having second predetermined laser parameters, said scribe in said second substrate being aligned with said near through cut in said first substrate;
  singulating said compound electronic devices by mechanically cleaving said second substrate along said scribe.

12. The method of claim 11 wherein a focal point of said laser beam is located at about said top surface of said first substrate to perform said laser machining of said near through cut in said first substrate.

13. The method of claim 11 wherein a focal point of said laser beam is located between about 100 microns and 1000 microns above said top surface of said first substrate to perform said laser machining of said scribe in said second substrate.

14. The, method of claim 11 wherein said near through cut in said first substrate is laser machined by making between 2 and 10 passes of said laser beam on said first substrate.

15. The method of claim 11 wherein a travel speed of said laser beam is between about 100 and 500 mm/s while performing said laser machining of said first substrate.

16. The method of claim 11 wherein a travel speed of said laser beam is between about 200 and 600 mm/s while performing said laser machining of said second substrate.

17. The method of claim 11, wherein laser machining said scribe in said second substrate with said laser beam having second predetermined laser parameters comprises directing said laser beam having second predetermined laser parameters through a portion of said first substrate.

* * * * *